United States Patent
Kim et al.

(10) Patent No.: US 9,972,822 B2
(45) Date of Patent: May 15, 2018

(54) BATTERY PACK INCLUDING BUSHING FOR CONNECTING END PLATE

(71) Applicant: LG CHEM, LTD., Seoul (KR)

(72) Inventors: Young-Gil Kim, Daejeon (KR); Jeong-O Mun, Daejeon (KR); Jae-Min Lee, Daejeon (KR); Dal-Mo Kang, Daejeon (KR); Soo-Ryoung Kim, Daejeon (KR); Jae-Hun Yang, Daejeon (KR); Sang-Wook Yim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 343 days.

(21) Appl. No.: 14/774,236

(22) PCT Filed: Mar. 25, 2015

(86) PCT No.: PCT/KR2015/002920
§ 371 (c)(1),
(2) Date: Sep. 10, 2015

(87) PCT Pub. No.: WO2015/190676
PCT Pub. Date: Dec. 17, 2015

(65) Prior Publication Data
US 2016/0126531 A1    May 5, 2016

(30) Foreign Application Priority Data

Jun. 11, 2014 (KR) .................... 10-2014-0070948

(51) Int. Cl.
*H01M 10/613* (2014.01)
*H01M 2/10* (2006.01)
*H01M 2/30* (2006.01)
*H01M 10/6554* (2014.01)
(Continued)

(52) U.S. Cl.
CPC ........ *H01M 2/307* (2013.01); *H01M 2/1022* (2013.01); *H01M 2/1061* (2013.01); *H01M 2/1077* (2013.01); *H01M 2/30* (2013.01); *H01M 10/425* (2013.01); *H01M 10/482* (2013.01);
(Continued)

(58) Field of Classification Search
CPC ....... H01M 10/425; H01M 2010/4271; H01M 10/482; H01M 10/6554; H01M 2/1077; H01M 2/30; H01M 2/307; H01M 2/10; H01M 2/20; H01M 2/26; H01M 10/613; H01M 10/60
See application file for complete search history.

(56) References Cited

U.S. PATENT DOCUMENTS

| | | |
|---|---|---|
| 8,399,119 B2 | 3/2013 | Koetting et al. |
| 2011/0070474 A1 | 3/2011 | Lee et al. |

(Continued)

FOREIGN PATENT DOCUMENTS

| | | |
|---|---|---|
| EP | 1 710 859 A1 | 10/2006 |
| JP | 2012-014938 A | 1/2012 |

(Continued)

*Primary Examiner* — Basia A Ridley
*Assistant Examiner* — Heng M. Chan
(74) *Attorney, Agent, or Firm* — Birch, Stewart, Kolasch & Birch, LLP

(57) ABSTRACT

Disclosed is a battery pack including a bushing for connecting an end plate. The battery pack according to the present disclosure connects an upper housing and an end plate for a battery module assembly by the bushing.

8 Claims, 6 Drawing Sheets

(51) Int. Cl.
    *H01M 10/42*     (2006.01)
    *H01M 10/48*     (2006.01)

(52) U.S. Cl.
    CPC ..... *H01M 10/613* (2015.04); *H01M 10/6554* (2015.04); *H01M 2010/4271* (2013.01)

(56) References Cited

U.S. PATENT DOCUMENTS

| | | | |
|---|---|---|---|
| 2011/0206948 A1* | 8/2011 | Asai | H01M 2/0473 429/7 |
| 2013/0189559 A1 | 7/2013 | Giere | |
| 2014/0134462 A1 | 5/2014 | Choi et al. | |
| 2014/0234690 A1 | 8/2014 | Lee et al. | |

FOREIGN PATENT DOCUMENTS

| | | |
|---|---|---|
| JP | 2013-503432 A | 1/2013 |
| JP | 2014-044884 A | 3/2014 |
| KR | 10-2007-0064221 A | 6/2007 |
| KR | 10-2010-0128927 A | 12/2010 |
| KR | 10-2013-0018494 A | 2/2013 |
| KR | 10-2013-0078933 A | 7/2013 |
| KR | 10-2014-0056835 A | 5/2014 |

* cited by examiner

BATTERY PACK INCLUDING BUSHING FOR CONNECTING END PLATE

TECHNICAL FIELD

The present disclosure relates to a battery pack, and more particularly, to a battery pack including a bushing for connecting an end plate.

The present application claims priority to Korean Patent Application No. 10-2014-0070948 filed in the Republic of Korea on Jun. 11, 2014, the disclosures of which are incorporated herein by reference.

BACKGROUND ART

Due to its characteristics of being easily applicable to various products and electrical characteristics such as a high energy density, a secondary battery is not only commonly applied to a portable device, but universally applied to an electric vehicle (EV) or a hybrid electric vehicle (HEV) propelled by an electric driving source. This secondary battery is gaining attention for its primary advantages of remarkably reducing the use of fossil fuels and not generating by-products from the use of energy, making it a new eco-friendly and energy efficient source of energy.

Currently available secondary batteries include lithium ion batteries, lithium polymer batteries, Ni—Cd batteries, Ni-MH batteries and Ni—Zn batteries. An operating voltage of such a unit secondary battery cell is about 2.5V-4.2V. When a higher output voltage is required, a plurality of secondary battery cells may be connected in series to construct a battery pack. Also, based on a charge/discharge capacity required for a battery pack, a plurality of secondary battery cells may be connected in parallel to construct a battery pack. Thus, a number of secondary battery cells included in the battery pack may be variously set based on an output voltage or charge/discharge capacity required.

When constructing a battery pack by connecting a plurality of secondary battery cells are connected in series/in parallel, a general method involves constructing a battery module including at least two secondary battery cells, constructing a battery module assembly using a plurality of battery modules, and adding various components to the battery module assembly to construct a battery pack. With regard to the battery module, its example is disclosed in the Applicant's own Korean Patent Application Publication Nos. 10-2007-0064221 and 10-2010-0128927.

DISCLOSURE

Technical Problem

The present disclosure is designed to address these issues of the related art, and therefore, the present disclosure is directed to providing a battery pack including a bushing for connecting an end plate.

Technical Solution

To achieve the above object, a battery pack according to the present disclosure includes a plurality of battery modules, each including two secondary battery cells, a module frame, and a cooling pin, a lower housing assembly including a cooling plate, a front housing, a rear housing, a busbar, and a sensing connector, and which is connected to a bottom of a battery module assembly in which the plurality of battery modules is assembled, a front circuit assembly which is electrically connected to the sensing connector and electrode leads formed in the plurality of battery modules included in the battery module assembly, a front cover which is connected to the front housing and prevents the front circuit assembly from being exposed to outside, two upper housings which are respectively connected to the front housing and the rear housing, an end plate for a battery module assembly disposed at both sides of the battery module assembly, and a bushing which connects the two upper housings and the end plate for a battery module assembly.

The end plate for a battery module assembly according to the present disclosure may include a first plate which comes into contact with one side of the battery module assembly, a second plate which comes into contact with the other side of the battery module assembly, and an upper strap extending from an upper edge of the first plate and an upper edge of the second plate.

According to one embodiment of the present disclosure, at least two upper straps may be provided.

According to one embodiment of the present disclosure, the upper strap may be disposed at a location to cover a center point of a top surface of the battery module assembly.

The end plate for a battery module assembly according to the present disclosure may further include a plurality of bushing connection plates extending from each of the first plate and the second plate, and having surfaces perpendicular to each of the first plate and the second plate and holes corresponding to a size of the bushing.

In this instance, the two upper housings may have holes into which each bushing is inserted, and the plurality of bushing connection plates may be formed at locations corresponding to the holes formed in the upper housings.

The battery pack according to the present disclosure may be an element of a battery operating system including the battery pack and a load which is supplied with power from the battery pack. In this instance, the load may be an electrical drive means or a portable device.

Advantageous Effects

According to the present disclosure, an end plate and a battery module assembly may be connected in a simple manner through bushing.

According to the present disclosure, an appearance change of a battery module caused by a swelling phenomenon may be prevented.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

A battery pack according to the present disclosure includes a battery module assembly in which a plurality of battery modules is assembled, a lower housing assembly, a front circuit assembly, a front cover, two upper housings, an end plate for a battery module assembly (hereinafter referred to as an 'end plate'), and a bushing. For convenience of understanding of the battery pack according to the present disclosure, each element of the battery pack will be described in an order of assembly.

Figure 1:
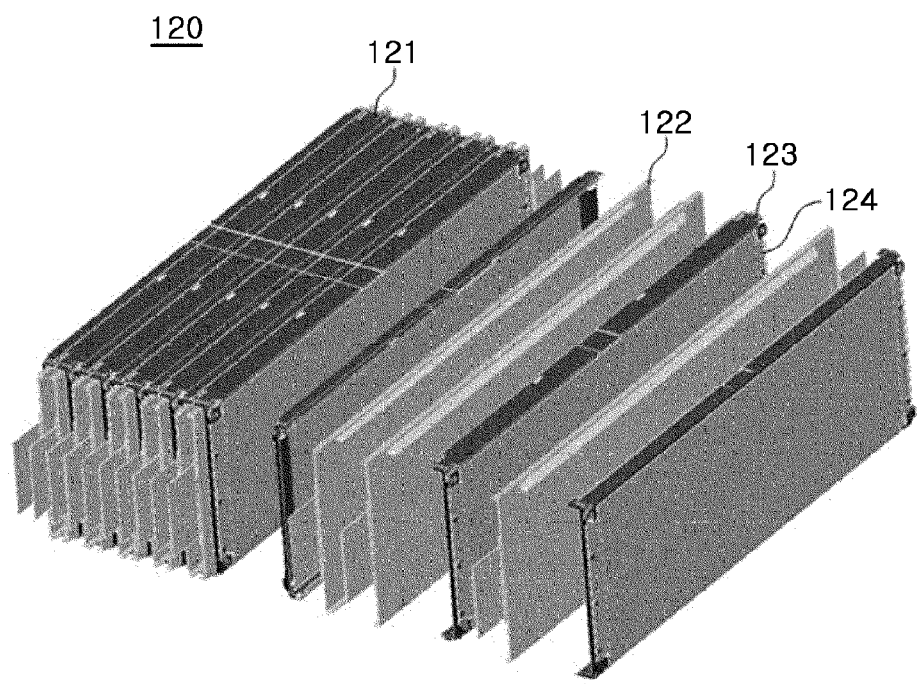
FIG. 1 is an exploded perspective view of a battery module assembly.

FIG. 1 is an exploded perspective view of a battery module assembly 120.

Referring to FIG. 1, the battery module assembly 120 is found as an assembly of a plurality of battery modules 121.

The battery module 121 has a secondary battery cell 122, a module frame 123, and a cooling pin 124.

The secondary battery cell 122 is not limited to a particular type. Each secondary battery cell 122 may include a lithium ion battery, a lithium polymer battery, a Ni—Cd battery, a Ni-MH battery and a Ni—Zn battery that can be recharged and has to consider a charge or discharge voltage. Preferably, as the secondary battery cell 122, a lithium polymer battery may be used. Also, the secondary battery cell 122 may be classified into a pouch-type secondary battery cell, a cylindrical secondary battery cell, and a prismatic secondary battery cell based on the case types. Preferably, as the secondary battery cell 122, a pouch-type secondary battery cell may be used.

The module frame 123 holds the secondary battery cell 122 to form a battery module. Also, the module frame 123 may have such an appearance that it is engaged and tied with adjacent other module frame. The module frame 123 may be made from polymer.

The cooling pin 124 acts to discharge heat from the secondary battery cell 122 by an indirect cooling method. The cooling pin 124 is connected to the side of the module frame 123 and comes into contact with the side of the secondary battery cell 122. The cooling pin 124 may be made from a metal. Preferably, the cooling pin 124 is made from aluminum.

Figure 2:
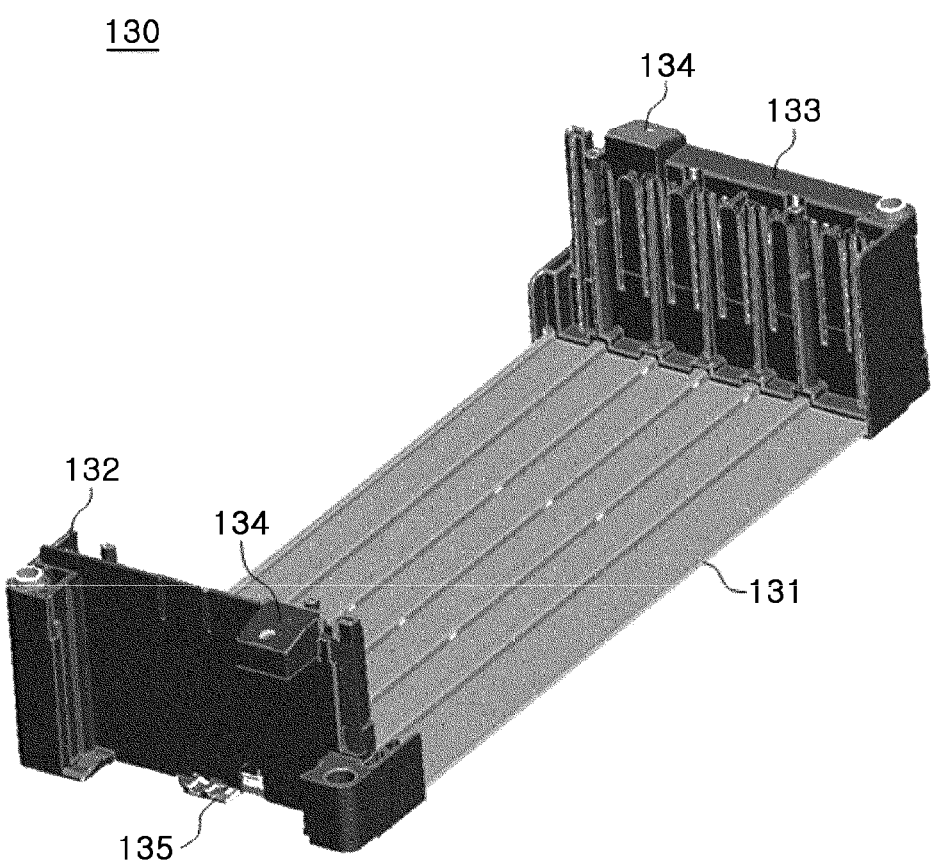
FIG. 2 is a perspective view of a lower housing assembly.

FIG. 2 is a perspective view of a lower housing assembly 130.

Referring to FIG. 2, the lower housing assembly 130 includes a cooling plate 131, a front housing 132, a rear housing 133, a busbar 134, and a sensing connector 135. The busbar 134 is electrically connected to an electrode lead of the secondary battery cell 122 to provide an electrical connection to an external device. The sensing connector 135 may be connected to a voltage sensor which measures voltage of the secondary battery cell 122. The lower housing assembly 130 is connected to a bottom of the battery module assembly 120.

Figure 3:
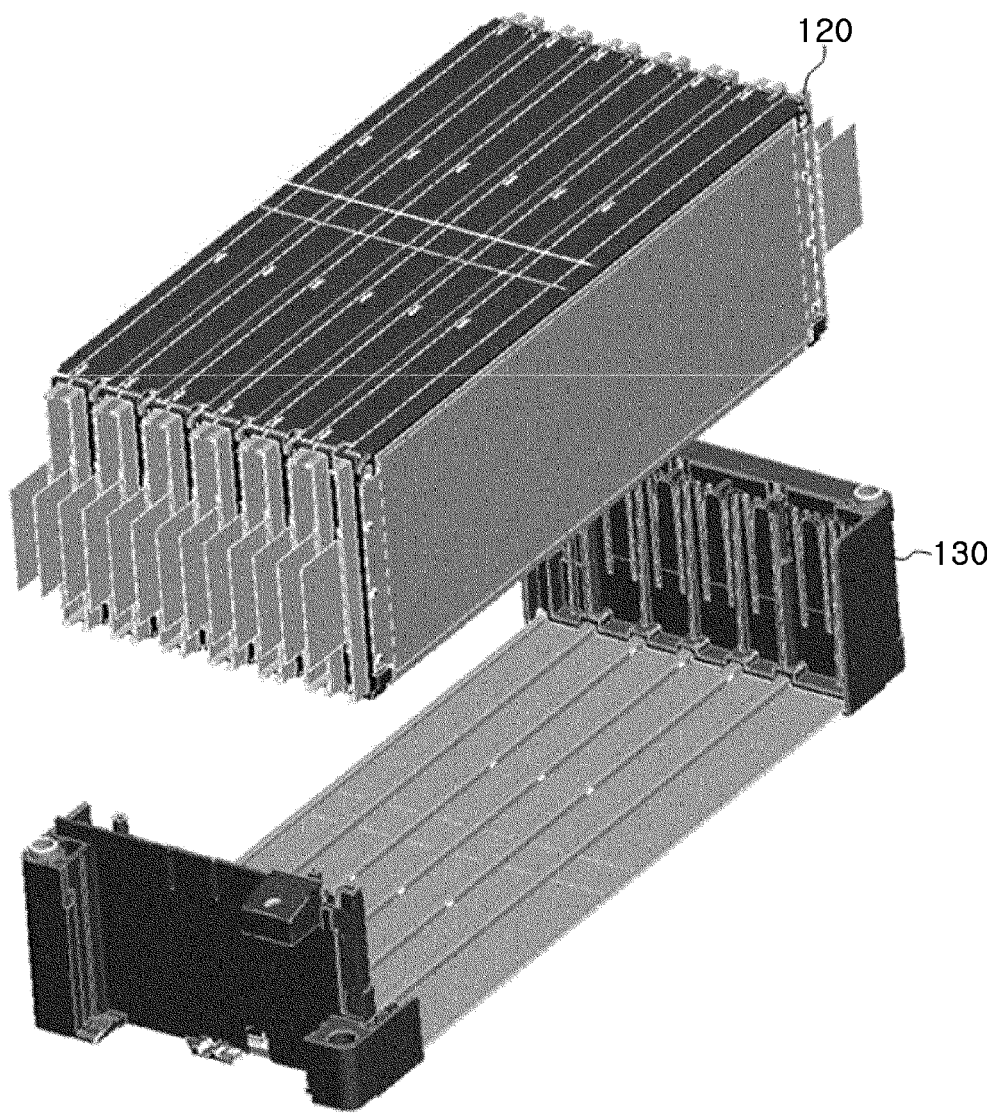
FIG. 3 is an exploded perspective view illustrating a connection relationship between a battery module assembly and a lower housing assembly.

FIG. 3 is an exploded perspective view illustrating a connection relationship between the battery module assembly 120 and the lower housing assembly 130.

Referring to FIG. 3, how can the lower housing assembly 130 be connected to the bottom of the battery module assembly 120 will be understood.

Figure 4:
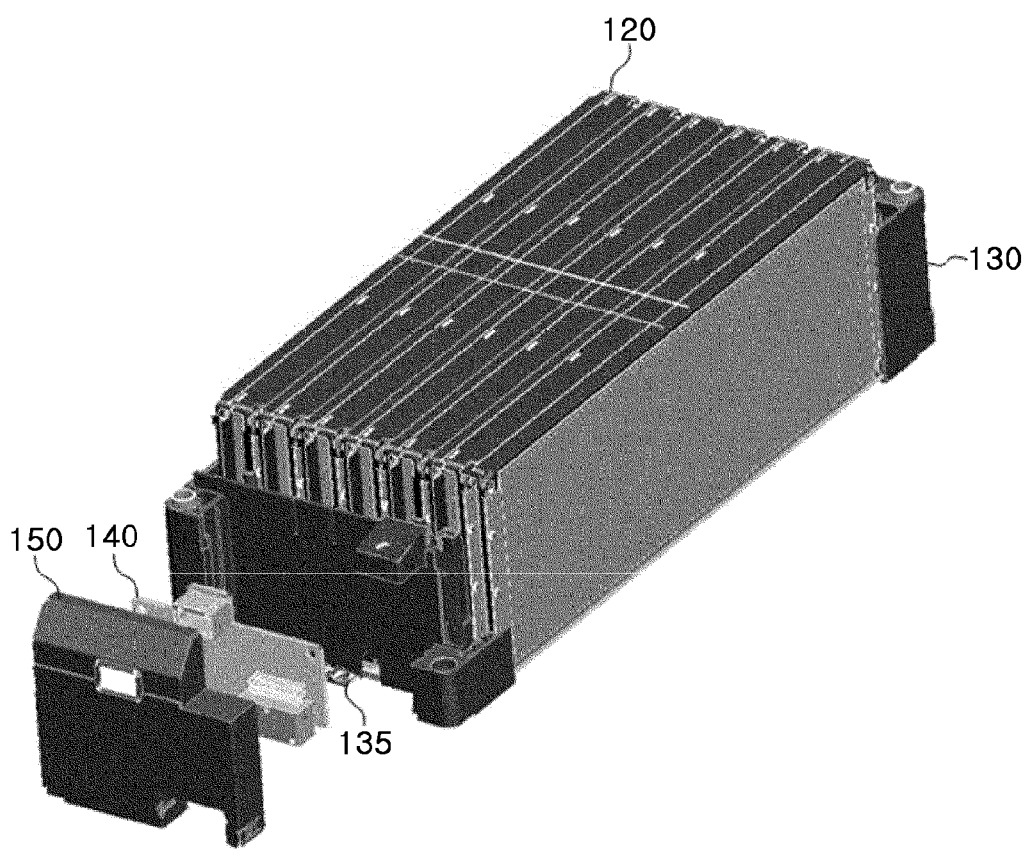
FIG. 4 is an exploded perspective view illustrating a connection relationship between a front circuit assembly and a front cover.

FIG. 4 is an exploded perspective view illustrating a connection relationship between a front circuit assembly 140 and a front cover 150.

The connection relationship between the front circuit assembly 140 and the front cover 150 can be seen with reference to FIG. 4. The front circuit assembly 140 is electrically connected to the sensing connector 135 included in the lower housing assembly 130 and the electrode leads of the plurality of battery modules 121 included in the battery module assembly 120. The front cover 150 is connected to the front housing 132 and prevents the front circuit assembly 140 from being exposed to the outside.

Figure 5:
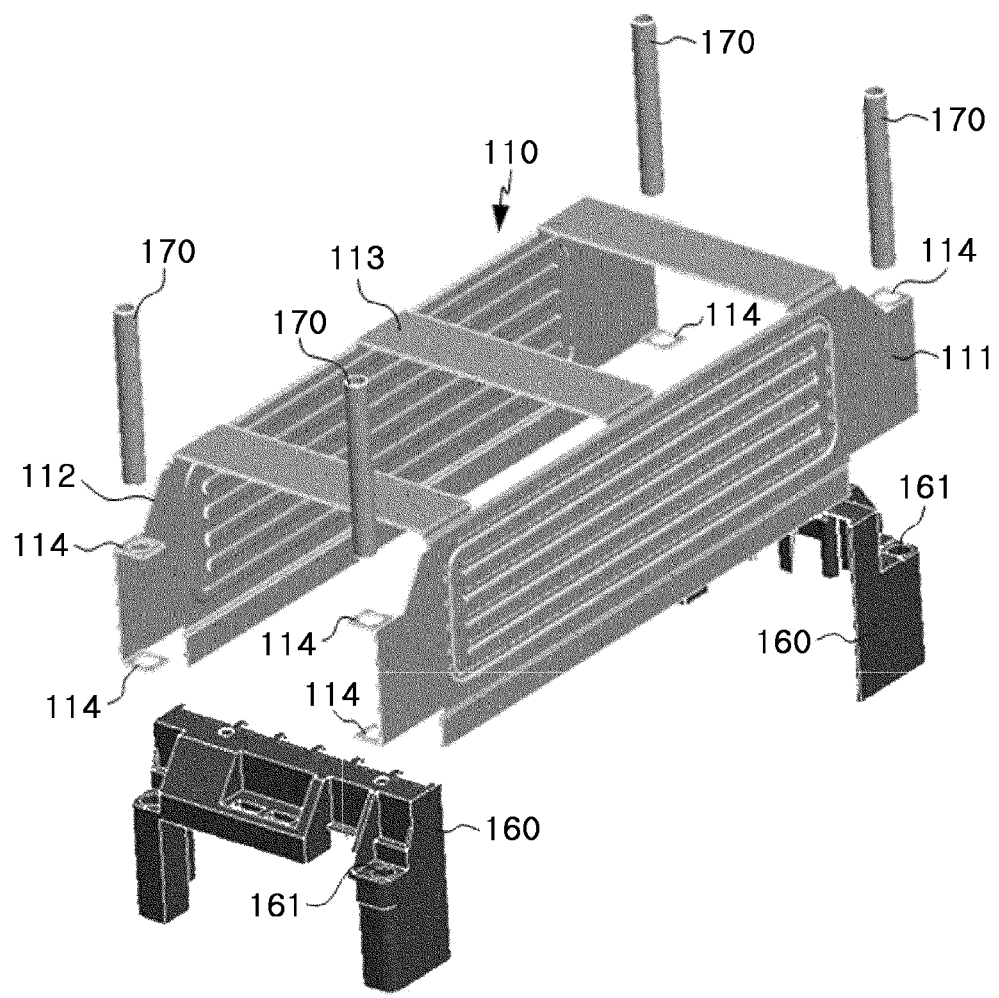
FIG. 5 is an exploded perspective view illustrating a connection relationship between an upper housing and an end plate.

FIG. 5 is an exploded perspective view illustrating a connection relationship between an upper housing 160 and an end plate 110.

Referring to FIG. 5, the upper housing 160, the end plate 110, and a bushing 170 are provided.

When a battery pack is completed, the end plate 110 is disposed at both sides of the battery module assembly 120.

Specifically, the end plate 110 may include a first plate 111, a second plate 112, and an upper strap 113. When a battery pack is completed, the first plate 111 comes into contact with one side of the battery module assembly 120. When the battery pack is completed, the second plate 112 comes into contact with the other side of the battery module assembly 120. The upper strap 113 has such a shape that it extends from an upper edge of the first plate 111 to an upper edge of the second plate 112. When the battery pack is completed, the upper strap 113 acts to prevent a swelling phenomenon of the battery module assembly 120.

According to one embodiment of the present disclosure, at least two upper straps 113 may be provided. Although FIG. 5 shows an embodiment in which three upper straps 113 are provided, the present disclosure is not limited to the disclosed embodiment.

According to one embodiment of the present disclosure, the upper strap 113 is formed at such a location to cover a center point of a top surface of the battery module assembly 120. Through this, a central part of the secondary battery cell which is most prone to change due to swelling may be fixed firmly.

When the battery pack is completed, the two upper housings 160 are respectively connected to the front housing 132 and the rear housing 133.

The bushing 170 acts to connect the two upper housings 160 and the end plate 110. To do so, the end plate 110 may include a plurality of bushing connection plates 114.

The plurality of bushing connection plates 114 extends from each of the first plate 111 and the second plate 112. Also, the plurality of bushing connection plates 114 has surfaces perpendicular to each of the first plate 111 and the second plate 112. Also, the plurality of bushing connection plates 114 has holes corresponding to a size of the bushing 170. For each of the two upper housings 160, holes 161 may be formed into which each bushing is inserted. Also, the plurality of bushing connection plates 114 may be formed at locations corresponding to the holes 161 of the upper housings 160.

Although FIG. 5 shows an embodiment in which the two upper housings 160 and the end plate 110 are connected using four bushings 170, the present disclosure is not limited to the disclosed embodiment.

Figure 6:
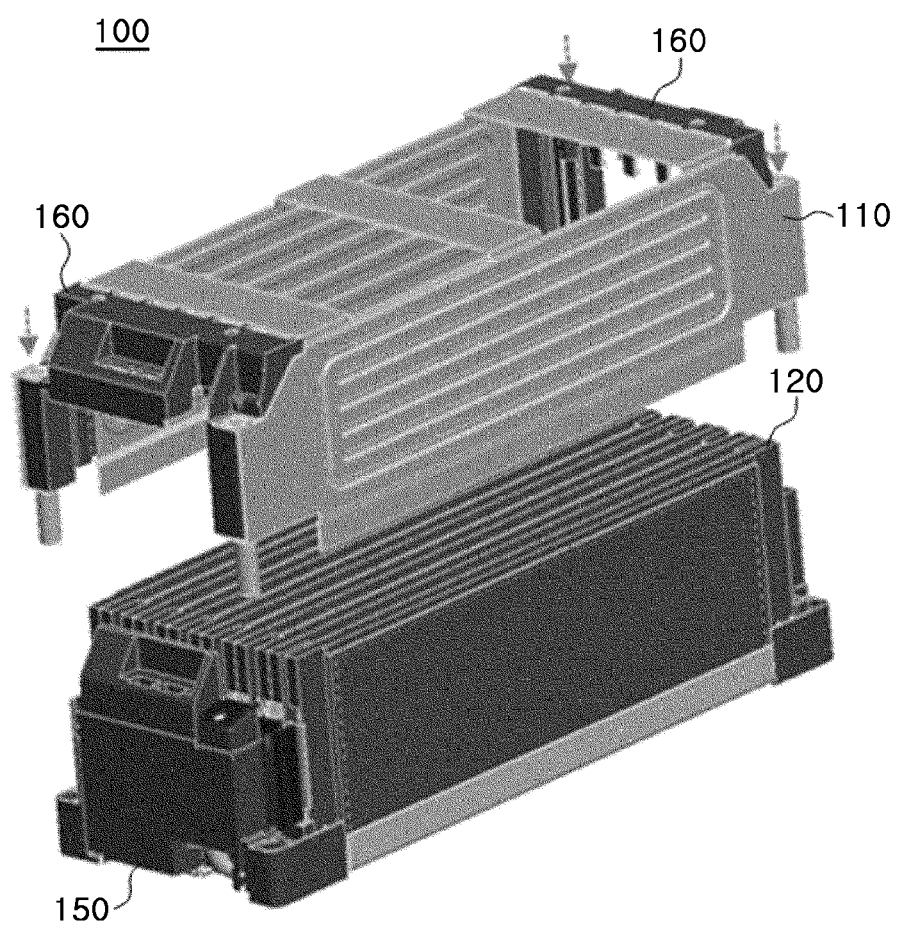
FIG. 6 is an exploded perspective view of a battery pack.

FIG. 6 is an exploded perspective view of a battery pack 100.

Referring to FIG. 6, how can the end plate 110 be connected to the battery module assembly 120 will be understood.

The battery pack 100 according to the present disclosure may be one element of a battery operating system including the battery pack 100 and a load which is supplied with power from the battery pack 100.

The battery operating system may be, for example, an electric vehicle (EV), a hybrid electric vehicle (HEV), an electric bike, a power tool, an energy storage system, an uninterruptible power supply (UPS), a portable computer, a mobile phone, a portable audio player, or a portable video player, and the load may be a motor that generates a rotational force by power supplied from the battery pack, or a power inverter circuit that inverts power supplied from the battery pack to power required for various circuit components.

Hereinabove, the present disclosure has been described by limited embodiments and drawings, but the present disclosure is not limited thereto and it should be understood that various changes and modifications may be made by an ordinary person skilled in the art within the spirit and scope of the disclosure and the appended claims and their equivalents.

What is claimed is:

1. A battery pack comprising:
    a plurality of battery modules, each comprising two secondary battery cells, a module frame, and a cooling pin;
    a lower housing assembly comprising a cooling plate, a front housing, a rear housing, a busbar, and a sensing connector, and which is connected to a bottom of a battery module assembly in which the plurality of battery modules is assembled;
    a front circuit assembly which is electrically connected to the sensing connector and electrode leads formed in the plurality of battery modules included in the battery module assembly;
    a front cover which is connected to the front housing and prevents the front circuit assembly from being exposed to outside;
    two upper housings which are respectively connected to the front housing and the rear housing;
    an end plate for the battery module assembly disposed at both sides of the battery module assembly; and
    a plurality of bushings which connects the two upper housings and the end plate for a battery module assembly.

2. The battery pack according to claim 1, wherein the end plate for the battery module assembly comprises:
    a first plate which comes into contact with one side of the battery module assembly;
    a second plate which comes into contact with the other side of the battery module assembly; and
    at least one an upper strap extending from an upper edge of the first plate and an upper edge of the second plate.

3. The battery pack according to claim 2, wherein at least two upper straps are provided.

4. The battery pack according to claim 2, wherein the at least one upper strap is disposed at a location to cover a center point of a top surface of the battery module assembly.

5. The battery pack according to claim 2, wherein the end plate for the battery module assembly further comprises a plurality of bushing connection plates extending from each of the first plate and the second plate, and having surfaces perpendicular to each of the first plate and the second plate and holes corresponding to a size of the plurality of bushings.

6. The battery pack according to claim 5, wherein the two upper housings have holes into which each bushing is inserted, and the plurality of bushing connection plates is formed at locations corresponding to the holes formed in the upper housings.

7. A battery operating system comprising:
    a battery pack according to claim 1; and
    a load which is supplied with power from the battery pack.

8. The battery operating system according to claim 7, wherein the load is an electrical drive means or a portable device.

* * * * *